United States Patent [19]

Wechsler

[11] 3,901,095

[45] Aug. 26, 1975

[54] BICYCLE GEAR SHIFT

[76] Inventor: Joseph W. Wechsler, 925 Enchanted Way, Pacific Palisades, Calif. 90272

[22] Filed: June 17, 1974

[21] Appl. No.: 479,990

[52] U.S. Cl............... 74/217 B; 74/551.8; 280/238; 280/261
[51] Int. Cl.².................... F16H 9/00; B62K 21/12; B62M 9/00; B62M 1/02
[58] Field of Search........ 74/217 B, 551.8; 280/261, 280/238, 210

[56] References Cited
UNITED STATES PATENTS

| | | | |
|---|---|---|---|
| 3,121,575 | 2/1964 | Bourgi | 74/217 B |
| 3,785,219 | 1/1974 | Anthamatten | 74/217 B X |

Primary Examiner—Leonard H. Gerin
Attorney, Agent, or Firm—Ralph B. Pastoriza

[57] ABSTRACT

A ten speed bicycle gear shift includes front and rear derailleurs actuated by a single continuous cable. Movement of the cable through a discrete given distance in one direction increases the gear ratio and movement of the cable through the same discrete given distance in an opposite direction decreases the gear ratio. First and second levers are mounted on the handlebar for easy manual stroking, operation of the first lever moving the cable through the discrete given distances in one direction and operation of the second lever moving the cable through the discrete given distances in an opposite direction. A marker on a portion of the cable can be visually observed relative to a fixed scale on the bicycle frame to indicate at all times the particular gear position. The gear shift is further characterized by cam arrangements for positively positioning the derailleurs in accordance with movement of the cable to selected positions.

13 Claims, 13 Drawing Figures

BICYCLE GEAR SHIFT

This invention relates generally to bicycles and more particularly to an improved gear shift mechanism for bicycles.

BACKGROUND OF THE INVENTION

In the bicycle art the terms "gear" and "sprocket" or "sprocket wheel" are often used interchangeably. In the present case the word "gear" will be used consistently throughout, it being understood that this term as used is equivalent to a sprocket.

Bicycle gear shifts generally are well known in the art and are usually designed to provide three, five, or ten distinct speeds. Normally where the number of gear positions is five, a rear gear cluster comprised of five gears in coaxial side-by-side relationship is provided together with a derailleur device for shifting the bicycle chain position laterally so that it will engage a desired gear in the cluster depending upon the particular selected gear ratio. In the case of a ten speed bike, there is normally provided a front gear cluster comprised of two gears having different numbers of teeth for cooperation with a rear gear cluster comprised of five gears. In these instances, a front derailleur is necessary to effect shifting of the bicycle chain between the two front gears making up the front gear cluster.

In most of the prior art ten speed bicycle gear shifts, two levers are provided on the frame connected to cables passing respectively to the front and rear derailleurs for operating the same. Each of the cables is normally maintained in tension by a strong spring built into the respective derailleur. Shifting of gears is accomplished by moving one or both of the derailleurs by pulling on the respective cables with the levers against the spring bias. A friction device holds each lever in its moved position so that the bicycle chain can be properly positioned on the selected front and rear gears. A further movement of either or both levers between their extreme positions will again operate the derailleurs to shift to another gear ratio.

Some of the problems encountered with the foregoing arrangements are as follows. First, for most gear positions, both of the levers must be operated. Since these levers are located normally on the down tube or head tube of the bicycle frame, a bicycle rider must continue to steer the bicycle with one hand on the handlebars and use his other hand to successively operate the levers. Moreover, the spring bias and friction hold must be overcome to move the levers. Second, the shift lever stroke is determined by "feel" and guesswork. There is no positive positioning of the derailleur because it has a continuous motion that passes through all intermediate positions. Normally, the shifting is completed when the bicycle chain is caught up on the selected gear and the derailleur may not always be in a consistent position for that particular gear, again depending upon the physical manner in which the lever is operated. Third, to shift the gears on the conventional prior art gear shift bicycles in proper sequence requires a mental analysis on the part of the bicycle rider or a memorization of the proper operating sequences of the two levers. In this respect, there is no easy means for the bicycle rider to determine the particular gear position. Normally he must examine carefully the particular gears in the cluster over which the bicycle chain is passing.

In addition to the foregoing, with conventional known gear shifting arrangements, the progression of gear ratio values through ten speeds is erratic; that is, the change in the gear ratio value from one shift to a next successive shift can vary from five per cent to nineteen per cent. Moreover, the shifting of the front and rear derailleurs when needed is not a consequence of a single lever operation, but rather must be done consecutively resulting in unwanted intermediate gear settings.

BRIEF DESCRIPTION OF THE PRESENT INVENTION

The present invention contemplates an improved gear shift mechanism designed in such a manner as to overcome the foregoing problems.

More particularly, shifting of the gear from any one position to another requires the operation of only a single shift lever which is conveniently located on the handlebars so that the bicycle rider can always keep his hands on the handlebar and still easily operate the shift lever. Moreover, the design is such as to eliminate the heretofore provided strong biasing spring the force of which had to be overcome in the prior art systems. Instead, the present invention utilizes a positive camming arrangement for positioning the derailleur and the lever stroke for actuating the derailleur is determined by mechanical limits in a positive manner so that there is no guesswork or feel involved. As a consequence, the derailleur itself is consistently and properly positioned for each gear ratio.

The foregoing is accomplished, in accord with the preferred embodiment of the present invention, by providing a front gear cluster comprised of coaxial front gears in side-by-side relationship rotatable by the pedals of the bicycle and a rear gear cluster comprised of coaxial rear gears in side-by-side relationship for rotating the rear wheel of the bicycle. A bicycle chain passes over one of the front gears and one of the rear gears. A front derailleur means is provided for shifting the chain from one gear to a next adjacent gear in the front gear cluster upon actuation and a rear derailleur means is provided for shifting the chain from one gear to a next adjacent gear in the rear cluster upon actuation. A single continuous actuating cable passes through the front and rear derailleur means in series, the front derailleur means being actuated in response to movement of the cable through a first given distance and the rear derailleur means being actuated in response to movement of the cable through a second given distance.

Manually operable first and second ratchet lever means are provided on the handlebars of the bicycle for moving the cable through successive given distances in one direction upon successive operation of the first ratchet lever, and through successive given distances in an opposite direction upon successive operation of the second ratchet lever. Successive movement of the first ratchet lever successively increases the gear ratio and successive movement of the second ratchet lever successively decreases the gear ratio.

A unique feature of the invention comprises the use of camming means in the form of cylindrical members having camming grooves therein for positively effecting the shifting of the derailleur means.

BRIEF DESCRIPTION OF THE DRAWINGS

A better understanding of the invention will be had by now referring to the accompanying drawings in which.

DETAILED DESCRIPTION OF THE PREFERRED EMBODIMENT

Figure 1:
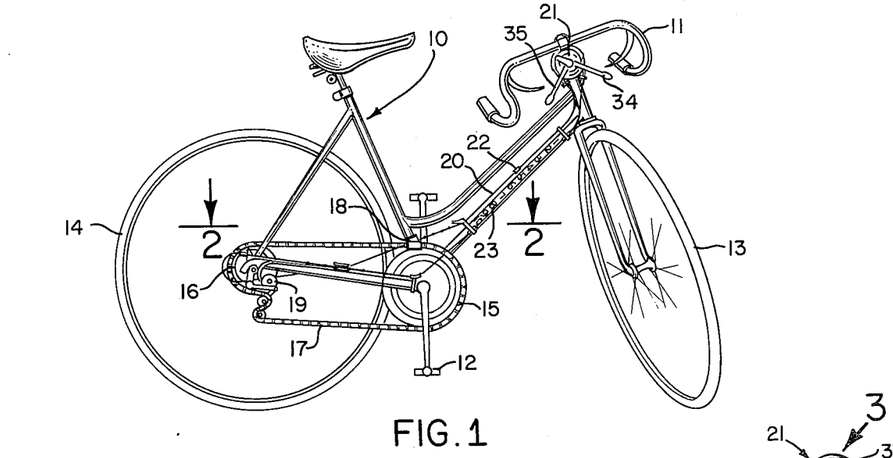
FIG. 1 is a side elevational view of a bicycle incorporating the improved gear shift of this invention.

Referring first to FIG. 1, there is shown a bicycle comprised of a frame structure 10 mounting handlebars 11, pedals 12, and front and rear wheels 13 and 14.

The improved gear shift mechanism of the present invention includes a front gear cluster 15 and a rear gear cluster 16. A bicycle chain 17 passes over one of the gears in the front gear cluster and one of the gears in the rear gear cluster. A front derailleur means indicated generally at 18 is associated with the front gear cluster and a rear derailleur means indicated generally at 19 is associated with the rear gear cluster.

Actuation of the front and rear derailleur means 18 and 19 is achieved by the provision of a single continuous actuating cable 20 passing from a manually operable lever means 21 mounted on the handlebars 10. Cable 20 passes through the front and rear derailleur means 18 and 19 in series and thence back to the lever means 21. The arrangement is such that first and second ratchet type levers making up the manually operable lever means 21 function to move the cable a given distance in one direction in response to stroking of the first of the levers and an equal given distance in an opposite direction in response to stroking of the second of the levers. One or both of the derailleur means is actuated in response to movement of the cable through the referred to given distance.

As a consequence of the foregoing, the physical position of the cable determines the particular gear position or ratio. Thus, still referring to FIG. 1, it will be noted that a portion of the cable runs parallel to a portion of the frame structure, this portion of cable being provided with a marker 22 and the corresponding portion of the frame structure being povided with a scale 23. By observing the position of the marker 22 on the cable 20 relative to the scale 23, the various gear combinations established by the various successive positions of the cable can be readily discerned by a bicycle rider.

Figure 2:
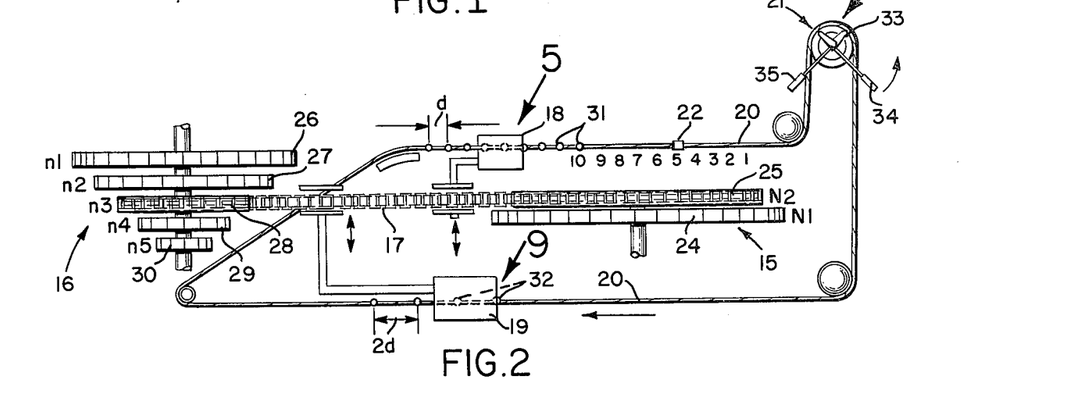
FIG. 2 is a highly schematic functional type block diagram illustrating the inter-relationship of components making up the gear shift mechanism wherein front and rear gear clusters are illustrated as viewed in the direction of the arrows 2—2 of FIG. 1.

Referring now to FIG. 2, further details of the gear shift will be described. As shown, the front gear cluster includes two gears 24 and 25 having N1 and N2 teeth respectively, different in number from each other. These gears are coaxially mounted in side-by-side relationship and coupled for rotation by the bicycle pedals.

The rear gear cluster 16 includes at least two and preferably five individual gears as shown at 26, 27, 28, 29 and 30. These gears have respectively $n1$, $n2$, $n3$, $n4$ and $n5$ teeth and are mounted coaxially together in side-by-side relationship and coupled to rotate the rear wheel of the bicycle.

In FIG. 2 the marker 22 on the cable 20 is shown adjacent to a scale comprised of numerals 1 through 10, designating the various gear positions to provide the ten speed gear shift for the bicycle of FIG. 1. A first given length of the cable 20 beyond the scale includes a first series of spaced enlargements 31 which might constitute beads or small spheres. For the ten speed bicycle to be described, there are provided nine such enlargements 31 equally spaced along the first given portion of the cable at a given distance designated by the letter $d$. These enlargements are arranged to pass through and actuate the front derailleur means 18 when an enlargement passes therethrough.

A second given length of the cable 20 shown in the lower portion of FIG. 2 includes a second series of spaced enlargements 32 which may also be in the form of beads or small spheres totalling four in number and equally spaced a second given distance which, in the embodiment shown, is exactly twice the first given distance $d$ and is accordingly designated $2d$ in FIG. 2. These enlargements will actuate the rear derailleur means 19 when passing therethrough.

As shown in the upper right hand portion of FIG. 2, the manually operable lever means 21 includes a drum means 33 about which the cable 20 passes such that rotation of the drum means in a first direction moves the cable in a first direction and rotation of the drum means in an opposite direction moves the cable in an opposite second direction. First and second ratchet levers 34 and 35 respectively are coupled to the drum for rotation through given circumferential distances corresponding to the distance $d$ for each stroke of either one of the levers.

Figures 3, 4:
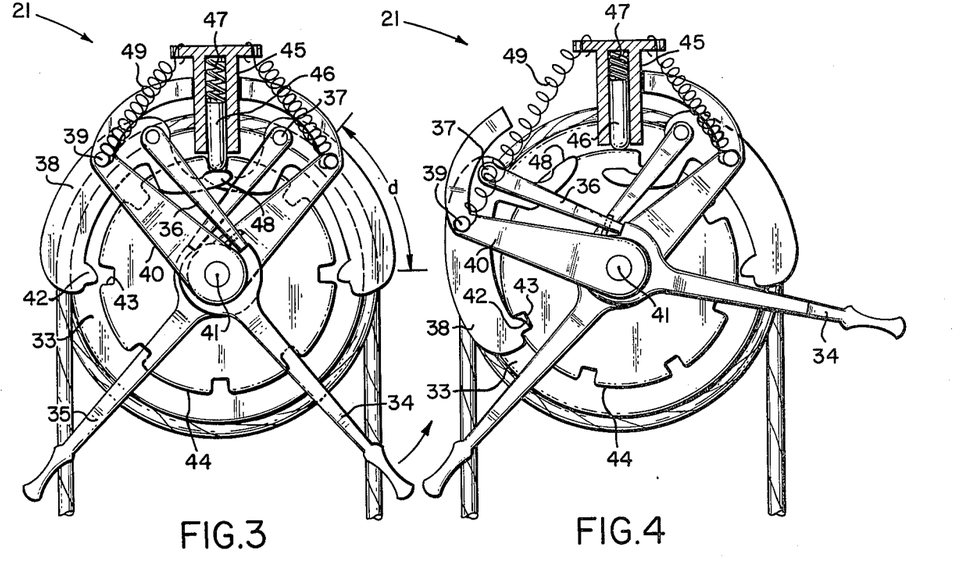
FIG. 3 is a front view of the inner working mechanisms of a manually operable lever means for the gear shift indicated by the arrow 3 in FIG. 2.
FIG. 4 is a view similar to FIG. 3 but showing a subsequent position of the components during a stroking operation of the lever means.

Referring now to FIG. 3, further details of the manually operable lever means 21 are shown. Thus, associated with the lever 34 is a small push bar 36 having one end arranged to be engaged by the hub portion of the lever arm and its other end pivoted at 37 to a pawl member 38. This pawl member 38 is pivotally supported at 39 to an arm 40 coaxially pivoted at 41 with the lever arm 34. The lower end of the pawl member 38 includes a pawl 42 receivable within an indentation 43 constituting one of a series of spaced indentations or indexing points on the periphery of a ratchet wheel 44 connected directly for rotation with the drum 33.

Associated with the ratchet wheel 44 is an indexing means shown at the top of the drawing of FIG. 3 in the form of a housing 45 slidably supporting an indexing pin 46 biased into one of the indentations of the wheel by a spring 47. It will be noted that this pin 46 is arranged to be engaged by a lift portion 48 integrally formed with the pawl member 38 such that rocking movement of the pawl member 38 about the pivot point 39 results in the lifting portion 48 removing the indexing pin 46 from a particular indexing indentation in the wheel 44.

In FIG. 3, the cable 20 is shown wrapped about the drum 33. Also, indicated in part by dotted lines, is the second lever 35 which includes a pawl member and other elements identical to those described with respect to the first lever arm 34 except that the arrangement is such that actuation of the second lever 35 will function to rotate the ratchet wheel 44 in an opposite direction.

FIG. 4 illustrates the relative positions of the various components described when a partial rotation of the ratchet wheel has been effected by the first ratchet lever 34. Thus, in operation, when the ratchet lever 34 is initially moved from a down towards an up position as indicated by the arrow in FIG. 3, the push bar element 36 will initially rock the pawl member 38 about the pivot point 39 thereby causing the pawl 42 to seat within the indentation 43 of the ratchet wheel. Simultaneously, this rocking movement of the pawl member 38 will cause the lifting portion 48 to remove the indexing pin 46 from the ratchet wheel indentation against the bias of spring 47. With the pawl 42 seated in the indentation 43, the mechanical parts are locked from further rotational movement about the pivot point 39 and thus further upward movement of the ratchet lever 34 will cause a rotation of both the drum and the ratchet wheel 44 against the bias of a tension spring 49 shown in FIG. 3 extending from the pivot point 39 to the upper housing 45. FIG. 4 shows the position of the elements during this additional rotation wherein it will be noted that the indexing pin 46 simply rides on the peripheral surface of the ratchet wheel preparatory to being received in the next indentation when the stroking of the lever is completed.

When the ratchet lever is released, the tension spring 49 returns the mechanism to the original position illustrated in FIG. 3 preparatory to a next stroke by the lever to rotate the wheel through a second discrete angle of rotation accurately determined by the indexing pin.

The second ratchet lever 35 operates in an identical fashion except that rotation of the ratchet wheel and thus the drum takes place in an opposite direction as described.

As indicated in FIG. 3, the circumferential distance through which the drum 33 moves corresponds to *d* which corresponds to the given discrete distances through which the entire cable 20 is moved in response to operation of one or the other of the ratchet levers.

From the description thus far, it will be seen that an arrangement has been provided wherein the continuous cable 20 may be successively moved in one direction through ten positions by successive stroking of the first ratchet lever 34. This action results in actuation of the front and rear derailleur means in such a manner as to cause a progressive gear change through all ten gears in one direction; for example, to progressively increase the gear ratios. Successive movement of the second ratchet lever 35, in turn will result in a progressive decrease in the gear ratio through all ten positions assuming the second lever is stroked successively ten times. It will be understood, of course, that increased or decreased gear ratios in single steps can be effected by actuating the first lever 34 once to increase the gear ratio one step or actuating the second ratchet lever 35 once to decrease the gear ratio.

Since the first and second ratchet levers are conveniently located on the handlebars, a bicycle rider can readily operate either one without removing his hands from the bars. Moreover, there is no need for the rider to memorize any particular combination since he will always know that operation of the first ratchet lever increases the gear ratio, whereas operation of the second ratchet lever decreases the gear ratio. For any one shift in gear ratio, only one ratchet lever need be operated.

As further previously described, movement of the cable 20 through a given distance in one direction or the other as a consequence of operation of the ratchet lever functions to actuate one or both of the front and rear derailleurs 5 and 9 to cause the desired gear shift. For the particular ten speed bicycle illustrated, and with reference to FIG. 2, it will be evident that when the chain 17 passes over the gear 25 with the least number of teeth in the front gear cluster and over the gear 26 constituting the gear with the greatest number of teeth in the rear gear cluster, the bicycle will be in its lowest gear position and the marker 22 on the cable will be juxtaposed the scale number 1. To shift to the next gear position 2, the bicycle rider will simply stroke the first ratchet lever 34 to rotate the drum 33 in a counterclockwise direction thus moving the marker 22 to the left as viewed in FIG. 2 causing a first one of the enlargements 31 to enter the front derailleur means 5. Actuation of this derailleur means 5 shifts the bicycle chain 17 from the second gear 25 having N1 teeth to the first gear 24 having N1 teeth. Because there is twice as much spacing between the enlargements 32 on the lower portion of the cable 20 as viewed in FIG. 2, the rear derailleur means 9 is not actuated so that the chain 17 will remain on the largest gear 26 in the example described.

If the rider at this point wishes to shift back to position 1, he will simply stroke the second ratchet lever 35 to rotate the drum 33 in a clockwise direction thereby moving the cable portion with the marker 22 to the right as viewed in FIG. 2 again causing actuation of the front derailleur 5 to shift the chain 17 back to the first gear 24.

Should the bicycle rider wish to progressively shift to higher gears, he will simply successively actuate the first ratchet lever 34 as initially described and because of the double spacing for the enlargements 32, the rear derailleur will be actuated every other stroke.

The particular gears engaged for each successive gear position from the lowest to highest are set forth in the following table:

| Gear Position | Gears Engaged |
| --- | --- |
| 1 | N2 – n1 |
| 2 | N1 – n1 |
| 3 | N2 – n2 |
| 4 | N1 – n2 |
| 5 | N2 – n3 |
| 6 | N1 – n3 |

-Continued

| Gear Position | Gears Engaged |
| --- | --- |
| 7 | N2 – n4 |
| 8 | N1 – n4 |
| 9 | N2 – n5 |
| 10 | N1 – n5 |

The front gears have different numbers of teeth such that $N1 > N2$. Similarly, the rear gears have different numbers of teeth from each other and progressively decrease in number such that $n1 > n2 > n3 > n4 > n5$. The actual numbers of teeth for each of the gears are such that the per cent change in gear ratio is substantially the same for a majority of the successive shifts. In an actual embodiment of the invention wherein $N1=52$, $N2=46$, $n1=34$, $n2=27$, $n3=21$, $n4=17$, and $n5=14$, this percentage change is about twelve per cent. As mentioned heretofore, in commonly used prior art ten speed gear arrangements, the per cent change varies as much as from five to nineteen per cent.

Figure 5:
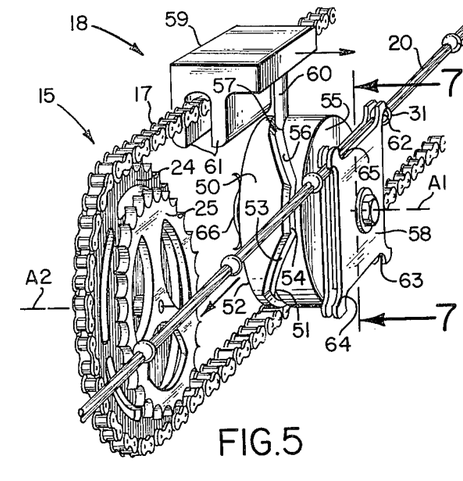
FIG. 5 is a perspective view, schematic in nature, of the front derailleur means designated by the arrow 5 in FIG. 2.

Referring now to FIG. 5, the manner in which shifting of the bicycle chain back and forth between the first and second gears 24 and 25 by the first derailleur means 18 as a consequence of movement of the cable 20 through the given distances will now be described. In FIG. 5, parts corresponding to those described heretofore are designated by the same numerals. Essentially, the front derailleur means includes a cylindrical member 50 rotatably mounted to the frame for rotation about a transverse axis designated A1 parallel to the axis A2 of the front gear cluster made up of the gears 24 and 25 as shown. This cylindrical member includes a peripheral camming groove 51 over a first 180° of its surface, extending from adjacent to one side 52 of the member along a first helical path length 53 and thence along a first circumferential path length 54 adjacent to the other side 55 of the member. The path then extends back along a helical path length 56 equal to the first helical path length and thence along a circumferential path length 57 equal to the first mentioned circumferential path length this latter path length being adjacent to the said one side 52. The camming groove continues in like manner over the remaining 180° of the surface of the cylindrical member 50 to connect to its starting point.

A drive plate 58 is arranged to be rotated in 90° steps by the enlargements 31 on the cable 20 shown in FIG. 5 as passing along the periphery of the plate. Rotation of this plate rotates the cylindrical member 50 in 90° steps.

Referring to the upper portion of FIG. 5 there is shown a first carriage 59 having a cam follower pin 60 received in the groove on the cylindrical member 50. The arrangement is such that rotation of the cylindrical member 50 will cam the cam follower pin 60 and thus the carriage 59 in a transverse direction as indicated by the arrow. As shown, the carriage 59 includes guide means 61 straddling the bicycle chain 17 and in alignment with the plane of one of the gears in the front cluster when the pin 60 is in the grooved position adjacent to one side wall of the member and in alignment with the plane of the other of the gears in the front cluster when the pin is in the grooved position adjacent the other side of the member 50.

Figure 6:
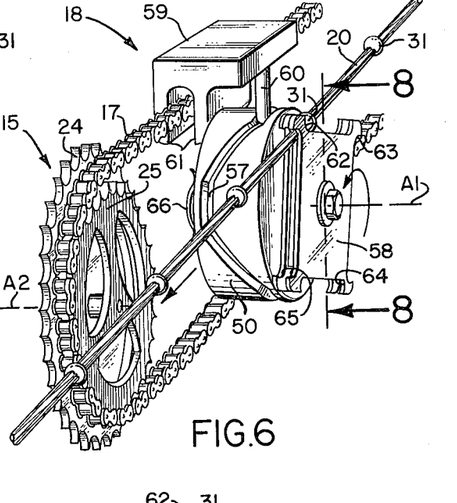
FIG. 6 is a view similar to FIG. 5, illustrating the relative positions of the components while a gear shift is in progress.

FIG. 6 shows the above mentioned latter position wherein the bicycle chain 17 has been shifted from the gear 24 to the gear 25 as a consequence of rotation of the cylindrical member 50.

In FIG. 5 it will be noted that the drive plate 58 essentially comprises two square plates defining therebetween a peripheral groove within which the cable 20 can be received, the separation distance of the plates being less, however, than the enlargements 31. The corners of the plates have ears which define engagement points 62, 63, 64 and 65. Engagement of any one engagement point by an enlargement 31 as a consequence of movement of the cable 20 will effect the desired rotation of the cylindrical member 50. To avoid any over-travel, a slight frictional drag is applied to the cylindrical member 50 as by means of a leaf spring 66 shown on the axle for the drum 50 engaging the one side surface 52.

Figure 7:
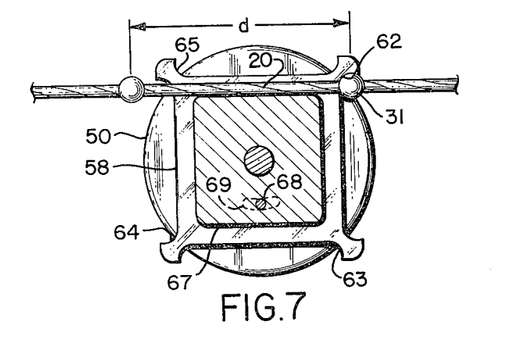
FIG. 7 is a side view of a portion of the structure of FIG. 5 taken in the direction of the arrows 7—7.
Figure 8:
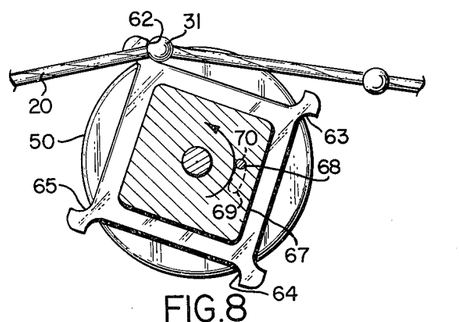
FIG. 8 is a view similar to FIG. 7 but taken in the direction of the arrows 8—8 of FIG. 6.

Further details with respect to the drive plate structure will be evident from FIGS. 7 and 8 wherein one of the plates has been removed to show the cable 20 passing in the groove. It will be noted that the floor of the groove is defined by the edges of a square 67. When an enlargement such as 31 engages one of the engagement points such as 62, it being assumed that the cable 20 is moving to the left, the rotation of the drive plate 58 will result in the cable lifting itself from the flat edge surface of the inner square 67. This separation is illustrated in FIG. 8 wherein a partial rotation of the drive plate and cylindrical member has taken place.

When the rotation is completed, the enlargement 31 will leave the engagement point 62 and the portion of the cable between the enlargements will then again seat on the flat edge of the inner square 67 thus indexing the drive plate and drum to a position exactly 90° from its previous position. In this respect the plate 58 includes a pin 68 received in a slot 69 in the cylindrical member 50 to provide a loose drive coupling of the plate to the cylinder so that slight over travel of the plate can take place to release an enlargement and the plate can then be indexed back to its 90° moved position. In FIG. 8, the pin 68 is shown driving the cylinder 50 by engaging one end 70 of the slot 69. After proper indexing, the engagement points are then properly positioned to be engaged by a next enlargement in response to movement of the cable in either direction.

It will be appreciated from the foregoing that the front derailleur is actuated each time an enlargement 31 passes therethrough as a consequence of movement of the cable through the heretofore referred to given distance $d$. The front derailleur means thus alternately shifts the chain between the two gears in the front gear cluster each time one or the other of the ratchet levers is stroked.

Figure 9:
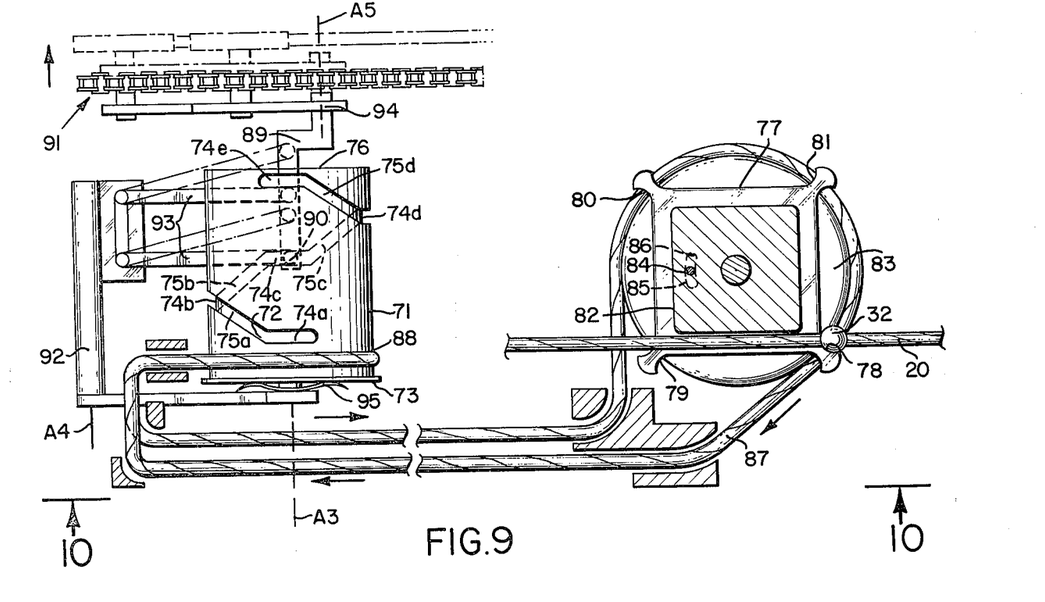
FIG. 9 is a top view, schematic in nature, of the rear derailleur means designated by the arrow 9 of FIG. 2.

Referring now to FIG. 9, details of the rear derailleur means will be described. As in the case of the front derailleur means, there is provided a cam arrangement in the form of a cylindrical member 71 mounted for rotation about the transverse axis A3 parallel to the axis of the rear gear cluster and including a peripheral camming groove 72 over its surface. This groove extends from adjacent to one side 73 along alternate circumferential and helical path portions, the circumferential portions being designated 74a, 74b, 74c, 74d, and 74e, and the helical paths being designated 75a, 75b, 75c, and 75d to a point adjacent to the other side 76 of the cylindrical member 71. In the particular embodiment show, the total of the path lengths is slightly greater than 360° so that the starting and ending points overlap slightly on opposite ends of the cylindrical member. The total of circumferential path portions 74a–74e corresponds to the total number of gears in the rear gear cluster which for the ten speed bicycle described, comprises five.

In the case of the rear derailleur cam member, a drive means for rotating the member through given distances takes the form of a drive plate 77 shown to the right in FIG. 9 similar to the drive plate 58 described in conjunction with the front derailleur means. This drive plate 77 is rotatably mounted to the frame and includes a plurality of equally circumferentially spaced engagement points defined by the ears at the corner of the plate as at 78, 79, 80 and 81. These engagement points are successively engaged by the second series of enlargements such as 32 when the cable 20 is passed through the mechanism.

As in the case of the drive plate for the front derailleur described in FIGS. 7 and 8, the drive plate 77 includes a central square 82 having flat edges defining the floor of the groove receiving the cable.

The plate 77 is coupled to a drum 83 by a pin 84 and slot 85 for rotating this drum upon each rotation of the drive plate, the pin engaging an end 86 of the slot when rotated clockwise. An auxiliary cable 87 surrounds the drum 86 and passes to the cylindrical member 71 to engage about an end portion thereof as indicated at 88. There is thus provided a flexible drive connection between the drive plate 77 and the cylindrical drum 71 the arrangement being such that a 90° rotation of the drive plate 77 will cause a 90° rotation of the cylindrical member 71.

Positioned beneath the cylindrical member 71 in FIG. 9 is a carriage 89 provided with a cam follower pin 90 projecting upwardly into the peripheral groove of the cylindrical member. In the solid line position of the carriage shown in FIG. 9, the pin 90 is positioned within the circumferential portion 74c of the groove.

An idler gear means designated generally at 91 is pivotally mounted to the carriage 89 as shown. This idler gear assembly 91, carriage 89, and cylindrical member 71 are all mounted for swinging movement about a main pivot 92 whose axis A4 is parallel to the axis A3 of the cylindrical member 71. The carriage 89 in turn is mounted by a parallelogram means including arms 93 to this main pivot so that transverse movements of the carriage 89 and the idler gear assembly 91 can take place as indicated by the phantom line position. This transverse movement, of course, will occur upon a rotation of the cylindrical member 71 resulting in a camming of the cam follower pin in the peripheral groove in a transverse direction.

The pivoting of the idler gear assembly 91 to the carriage 89 is shown at 94, the pivoting taking place about an axis A5 parallel to the axes A3 and A4. As in the case of the cylindrical camming member for the front derailleur, the cylindrical cam member 71 in FIG. 9 is provided with a friction drag as by a small leaf spring 95 engaging the one side 73. It should be understood that the provision of the drum 83 for the drive plate 77 and the auxiliary flexible cable 87 for actually effecting rotation of the cylindrical member 71 permits the swinging movement of the derailleur assembly about the pivot 92 without resulting in any motion of the drive plate 77 associated with the actuating cable 20.

Figure 10:
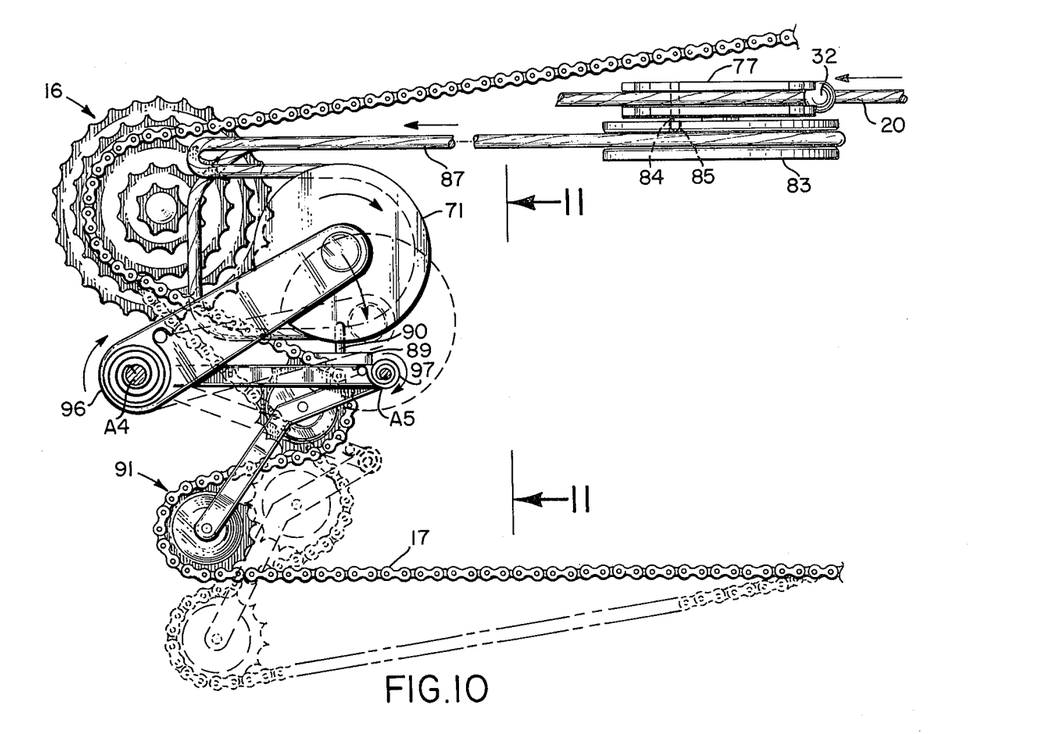
FIG. 10 is a side view taken in the direction of the arrows 10—10 of FIG. 9.
Figure 11:
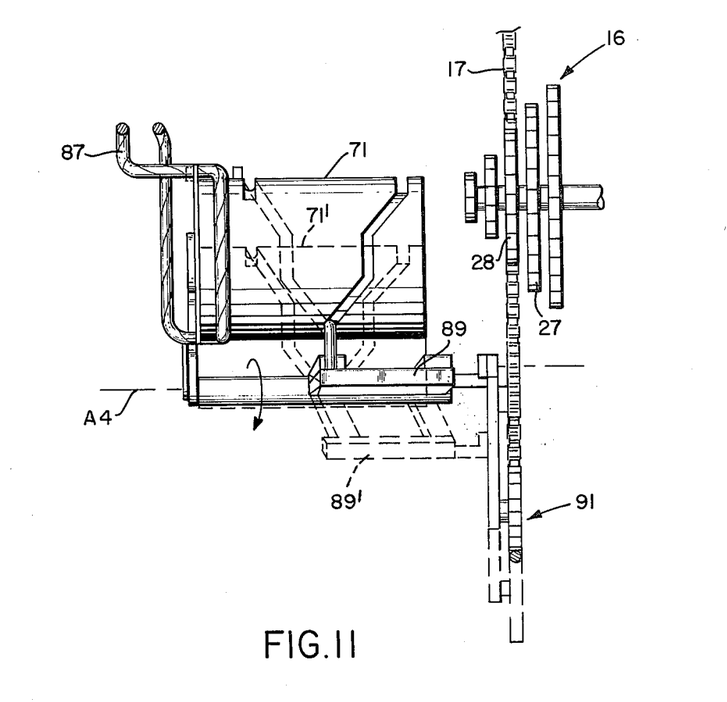
FIG. 11 is a front view taken in the direction of the arrows 11—11 of FIG. 10.

All of the foregoing will be better understood by now referring to the side elevation and front views of the rear derailleur assembly as illustrated in FIGS. 10 and 11. In these latter two figures, parts corresponding to those described in FIG. 9 are designated by the same numerals.

Thus, referring to the upper right hand portion of FIG. 10, the relationship of the drive plate 77 to the cable 20 and enlargement 32 is shown together with the drum 83 coupled by pin 84 and slot 85 to the plate structure 77 for rotation thereby. The auxiliary cable 87 is shown passing about the front end of the cylindrical member 71. The cam follower pin 90 in turn is shown projecting into the underside groove of the cylindrical member 71 and the pivoting of the idler gear assembly 91 for rotation about the axis A5 to the carriage 89 is evident. The path of the bicycle chain 17 over the idler gears and thence to the rear gear cluster 16 is also clear.

In FIG. 10, there is illustrated by the dashed phantom lines the swinging of the cylindrical member 71 and carriage 89 together with the idler gear assembly about the main pivot 92; that is, the axis A4. Also illustrated by phantom lines is a further pivoting or swinging movement of the idler gear assembly 91 about the pivot axis A5 of the carriage assembly 89.

The first above-mentioned pivoting action about the main pivot 92 permits positioning of the chain to accommodate larger diameter gears while the second pivoting action of the idler gears provides sufficient slack in the bicycle chain to permit its engagement with a next adjacent gear should the next adjacent gear be of larger diameter. These respective swinging or pivoting actions take place aided by a coil spring 96 and against the bias of a coil spring 97. Essentially, the pivot arm means 92 and the auxiliary pivot means to the carriage or movement about the axis A5 are biased to swing in a manner to maintain the chain in proper alignment with the periphery of any particular gear over which it passes and to maintain a tension in the chain, respectively.

Referring to the front view of FIG. 11, there is again illustrated by the phantom lines for the cylindrical member 71 and the carriage 89, designated 71' and 89' respectively the repositioning of these components upon swinging movement about the main pivot axis A4. Further, the alignment of the idler gear assembly 91 with the particular gear in the rear gear cluster 16 over which the chain 17 is to pass will be evident.

Figure 12:
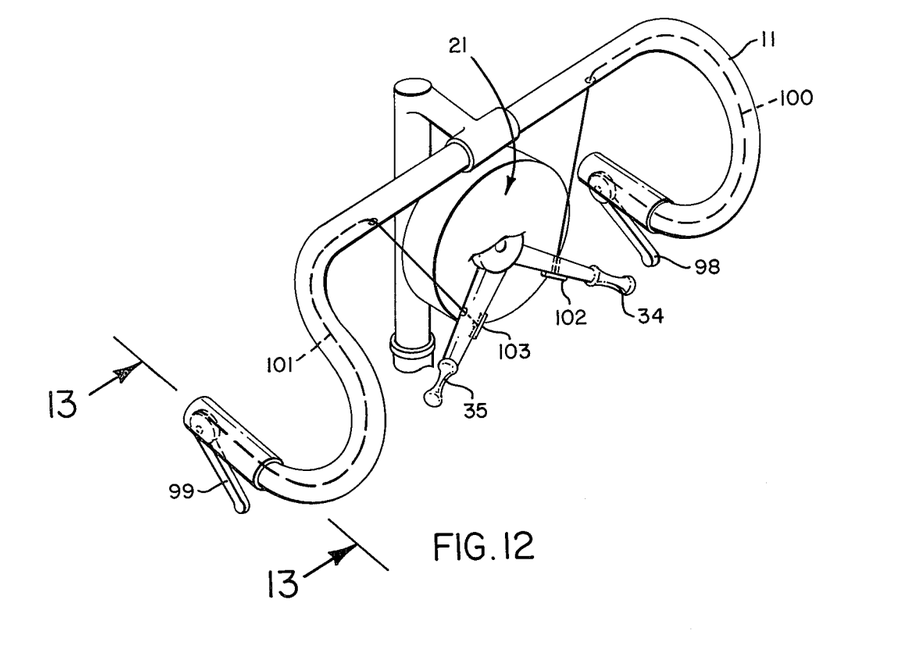
FIG. 12 is a perspective view of the bicycle handlebars showing an additional pair of operating levers.

FIG. 12 shows how additional levers may be added to the handlebars 11 to operate the ratchet levers.

Thus there are shown adjacent to the handle grips, first and second additional levers 98 and 99 respectively coupled by first and second cables 100 and 101 passing within the handle bars to the first and second ratchet levers 34 and 35. These cables terminate in enlarged heads 102 and 103 after passing through openings in the levers so that operation of the levers 34 and 35 will not disturb the additional levers 98 and 99.

On the other hand, pulling of the cables 100 or 101 will stroke the coupled ratchet lever since the enlarged head cannot pass through the lever opening.

Figure 13:
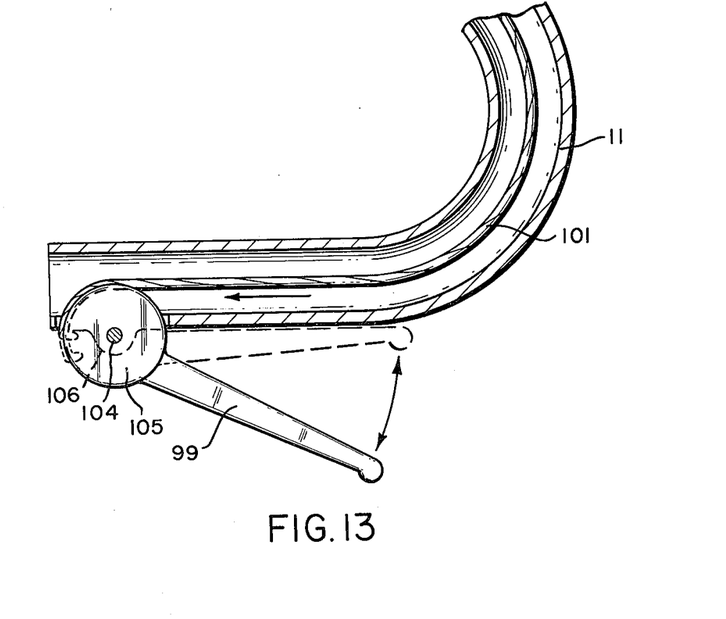
FIG. 13 is a fragmentary cross section in the direction of the arrows 13—13 of FIG. 12.

FIG. 13 shows the additional lever 99 pivoted at 104 to the handle bar grip. A drum 105 connected to the lever 99 receives and secures the end of the cable 101 as at 106 so that rotation of the drum by movement of the lever 99 in a counterclockwise direction as viewed in FIG. 13 pulls the cable 101 a sufficient distance to stroke the coupled ratchet lever 35 of FIG. 12. The other additional lever 98 operates in a similar manner to stroke the ratchet lever 34.

With the foregoing arrangement, the ratchet means 21 can be operated easily by a bicycle rider whether his hands are on the cross portion of the handle bars or on the grip portions.

OPERATION

The operation of the improved gear shift mechanism will be evident from the foregoing description.

Referring first to FIG. 2, assume that the gear ratio is an intermediate gear position such as position No. 5 as indicated by the marker 22 relative to the scale. In this event, the chain 17 will pass over the gear 25 in the front gear cluster and the gear 28 in the rear gear cluster.

As a person is riding his bicycle along in this particular gear position, should he wish to decrease the gear ratio in order to facilitate riding the bicycle along an upgrade, he need only stroke the second ratchet lever 35 with his right hand without removing the same from the bicycle handlebars. Stroking of this second ratchet lever moves the cable 20 as described heretofore causing one of the enlargements 31 to pass through the front derailleur structure 5.

Referring specifically to FIG. 6, this action will move the cable 20 to effect a 90° rotation of the cylindrical member 50 to thereby shift the carriage 59 from right to left as viewed in FIG. 6; that is, to the position illustrated in FIG. 5 wherein the guide means 61 aligns the chain with the larger gear 24 in the front gear cluster.

In the particular shift described, the rear derailleur 9 will also be actuated by one of the enlargements 32 shown in FIG. 2.

Referring to FIG. 9, this enlargement 32 is shown engaging the drive plate 77 at engagement point 78 to thereby effect a clockwise rotation of the drive plate 77 and auxiliary cable drum 83 through 90°. This motion is transferred through the auxiliary cable 87 to the cylindrical member 71 to rotate it in a clockwise direction looking along the axis A3 from the lower portion of the drawing. This action cams the carriage 89 as shown until the cam follower pin 90 seats in the next successive circumferential path portion 74d of the peripheral groove, thereby moving the idler gear assembly 91 to the phantom line position shown in FIG. 9.

Referring to FIG. 11, the shift of the carriage 89 and idler gear assembly 91 will be in a direction to realign the bicycle chain 17 from the gear 28 to the next larger diameter gear 27.

The marker 22 of FIG. 2 will now be adjacent to the number 4 indicating the next decreased gear ratio.

It will be noted from the foregoing that both derailleurs have been actuated by a single operation of the second ratchet lever 35 all in an automatic manner.

In the event the bicycle rider wished to increase the gear ratio from the initial position No. 5 in FIG. 2, he would simply operate the first ratchet lever 34 with his left hand without having to let go of the handlebars. A stroking of this lever would then move the cable in a manner to again operate the front derailleur from the position shown in FIG. 6 to the position shown in FIG. 5, thereby shifting the chain 17 onto the larger gear in the front cluster. However, since the enlargements 32 for operating the rear derailleur 9 in FIG. 2 are spaced twice as far apart as the enlargements 31, the rear derailleur would not be actuated and thus the chain would remain on the gear 28 when the shift is made to the next higher gear position 6 from the gear position 5.

The rear derailleur is thus actuated only every other stroke of any one of the ratchet levers.

It will be immediately evident that the shifting of the bicycle gears is not only greatly facilitated but is positively carried out, the stroke limits being mechanically defined by the indexing means on the lever arrangement as described in FIGS. 3 and 4. Moreover, the cam means in the form of the cylindrical members assures a positive positioning of the derailleur portions which positioning is consistent for each gear position throughout the range. Reliance on feel and the like is thus avoided.

A particular advantage of the use of enlargements on the actuating cable resides in the fact that their spacing can be adjusted in accord with the gear arrangement in each cluster. Thus, if three gears were used in the front cluster, the second series of enlargements might be spaced at three times the distance $d$ rather than twice.

While the particular preferred embodiment has been described in conjunction with a ten speed bicycle with front and rear derailleurs, it should be understood that the basic principles of this invention are applicable to other gear combinations and other speed bicycles. The invention accordingly is not to be thought of as limited to the specific embodiment set forth for illustrative purposes.

What is claimed is:

1. A bicycle gear shift including, in combination;
   a. a first gear;
   b. a gear cluster including at least two gears of different numbers of teeth in coaxial side-by-side relationship;
   c. a bicycle chain passing over said first gear and one of said gears in said gear cluster;
   d. derailleur means; and,
   e. actuating means for actuating said derailleur means to shift the chain from said one of the gears in said cluster to the next adjacent gear when said actuating means is positively moved in one direction and to shift the chain from said next adjacent gear back to said one gear when said actuating means is positively moved in an opposite direction, said derailleur means including a cam means; a carriage including a cam follower engaging said cam means, movement of said cam means relative to said cam follower causing a transverse movement of said carriage, said carriage supporting guide means for said chain to thereby effect shifting of the chain from a position in alignment with one gear to a position in alignment with a next adjacent gear, reverse movement of said cam means retracting said cam follower to cause a transverse movement of said carriage in an opposite direction to thereby effect shifting of the chain from a position in alignment with said next adjacent gear to a position in alignment with said one gear, said cam means being connected to said actuating means for movement thereby.

2. The subject matter of claim 1, in which said actuating means includes a continuous cable passing through said derailleur means, the derailleur means being actuated in response to movement of said cable through a given distance; and manually operable means for positively moving said cable in said one direction and in said opposite direction, respectively.

3. The subject matter of claim 1, in which said cam means comprises a cylindrical member mounted for rotation about an axis parallel to the axis of said gear cluster, said member including a peripheral groove starting adjacent to one side of the member and following an alternate helical and circumferential path towards the other side of the member, said cam follower comprising a cam pin on said carriage received in said groove.

4. A bicycle gear shift including, in combination;
   a. a front gear cluster comprised of coaxial front gears in side-by-side relationship rotatable by the pedals of said bicycle;
   b. a rear gear cluster comprised of coaxial rear gears in side-by-side relationship rotatable with the rear wheel of said bicycle;
   c. a bicycle chain passing over one of the front gears and one of the rear gears;
   d. a front derailleur means for shifting the chain from one gear to a next adjacent gear in said front gear cluster upon actuation;
   e. a rear derailleur means for shifting the chain from one gear to a next adjacent gear in said rear cluster upon actuation;
   f. a single continuous actuating cable passing through the front and rear derailleur means in series, the front derailleur means being actuated in response to movement of said cable through a first given distance and the rear derailleur means being actuated in response to movement of said cable through a second given distance;
   g. manually operable means on a portion of the frame for moving said cable through said first given distance each time the manually operable means is operated; and,
   h. scale means and cooperating marker means for indicating gear positions, relative movement between said scale means and marker means taking place in response to movement of said cable whereby a particular gear position is visually indicated.

5. The subject matter of claim 4, including manually operable first and second ratchet lever means for moving said cable through successive distances each of which corresponds to said first given distance in one direction upon successive operation of said first ratchet lever, and for moving said cable through successive distances, each of which corresponds to said first given distance in an opposite direction upon successive operation of said second ratchet lever, successive movement of said first ratchet lever successively increasing the gear ratio and successive movement of said second ratchet lever successively decreasing the gear ratio.

6. In combination with a bicycle having a frame structure mounting handlebars, pedals, and front and rear wheels, an improved gear shift including:
   a. a front gear cluster including two gears having N1 and N2 teeth respectively, different in number from each other, coaxially mounted in side-by-side relationship and coupled for rotation by the bicycle pedals;
   b. a rear gear cluster including at least two gears having $n1$ and $n2$ teeth respectively, different in number from each other coaxially mounted together in side-by-side relationship and coupled to rotate said rear wheel;
   c. a bicycle chain passing over one of the gears in the front gear cluster and one of the gears in the rear gear cluster;
   d. a front derailleur means coupled to the bicycle frame structure and to said bicycle chain associated with said front gear cluster;
   e. a rear derailleur means coupled to the bicycle frame structure and to said bicycle chain associated with said rear gear cluster;
   f. a manually operable lever means mounted on the bicycle for manual operation by a bicycle rider while holding said handlebars; and,
   g. a single continuous actuating cable passing from said lever means through the front and rear derailleur means in series and back to said lever means such that each actuation of said lever means moves said cable a given distance, a first given length of said cable having a first series of spaced enlargements separated by said given distance for actuating said front derailleur means when an enlargement passes therethrough, and a second given length of said cable having a second series of spaced enlargements, separated by twice said given distance for actuating said rear derailleur means when an enlargement passes therethrough, said front derailleur means functioning upon each actuation to shift said chain from one of the two gears in said front gear cluster to the other, and said rear derailleur means functioning upon actuation to shift said chain from one of the gears in said rear gear cluster to the next adjacent gear, said rear derailleur means only being actuated once for every two actuations of said lever means.

7. The subject matter of claim 6, in which a portion of said cable runs parallel to a portion of the frame structure, there being provided a marker on said cable and a scale on the frame, whereby the various gear combinations established by the various successive positions of said cable can be discerned by observing the position of the marker relative to the scale.

8. The subject matter of claim 6, in which said lever means includes a drum means about which said cable passes such that rotation of said drum means in a first direction moves said cable in a first direction and rotation of said drum means in an opposite direction moves said cable in an opposite second direction; a first ratchet lever coupled to said drum for rotating it through a given circumferential distance to move said cable said given distance in said first direction; a second ratchet lever coupled to said drum for rotating it through said given circumferential distance in an opposite direction to move said cable said given distance in said second direction; and indexing means for mechanically engaging said drum means at circumferentially spaced indexing points separated by said given distance to assure that said drum means is only rotated through a given number of degrees to move the cable said given distance for each stroke of one or the other of the ratchet levers.

9. The subject matter of claim 8, including first and second additional levers mounted adjacent to the handle bar grips; and first and second cables respectively coupling the additional levers to said first and second ratchet levers whereby the ratchet levers may be stroked by operation of the additional levers.

10. The subject matter of claim 6, in which said front derailleur means includes a cylindrical member rotatably mounted to said frame for rotation about a transverse axis parallel to the axis of said front gear cluster and having a peripheral camming groove over a first 180° of its surface extending from adjacent to one side of the member along a first helical path length to a point adjacent to the other side of the member and thence along a first circumferential path length adjacent to said other side, and thence back along a helical path length equal to said first helical path length to a point adjacent to said one side, and thence along a circumferential path length equal to said first circumferential path length adjacent to said one side, the camming groove continuing in like manner over the remaining 180° of said surface to connect to its starting point; a drive plate coupled to said cylindrical member and having four engagement points spaced at 90° from each other over which said first given length of said cable passes, such that when any one of said engagement points is engaged by one of said first series of enlargements as said cable is moved through said given distance, said drive plate is rotated 90° to thereby rotate said cylindrical member 90°; a first carriage having a cam follower pin received in said groove such that said carriage is shifted laterally in the axial direction of said cylindrical member in response to rotation of said member, said carriage including guide means straddling said chain and in alignment with the plane of one of said gears in the front cluster when the pin is in the grooved position adjacent said one side of said member and in alignment with the plane of the other of said gears in the front cluster when the pin is in the grooved position adjacent said other side of said member.

11. The subject matter of claim 6, in which said rear derailleur means includes a cylindrical member mounted for rotation about a transverse axis parallel to the axis of said rear gear cluster and having a peripheral camming groove over its surface extending from adjacent to one side of the member along alternate circumferential and helical path portions to a point adjacent the other side of the member, the number of circumferential path portions corresponding to the number of gears making up said rear gear cluster; a drive means for rotating said cylindrical member including a drive plate rotatably mounted to said frame and having a plurality of equally circumferentially spaced engagement points over which said second given length of said cable passes such that when any one of said engagement points is engaged by one of said second series of enlargements as said cable is moved through twice said given distance, said drive plate is rotated to thereby cause a given rotation of said cylindrical member; a rear carriage having a cam follower pin received in said grooves such that said carriage is shifted laterally in the axial direction of said cylindrical member from one circumferential path portion to a next successive circumferential path portion in response to each given rotation of said cylindrical member, said carriage carrying idler gear means over which said chain passes; main pivot arm means mounting said cylindrical member and carriage to said frame for swinging movement about a transverse axis parallel to the axis of the rear gear cluster; parallelogram coupling means mounting said carriage to said main pivot means to permit transverse movement of said carriage; and, auxiliary pivot means mounting said idler gear means to said carriage for swinging movement about an axis parallel to the axis of said rear gear cluster relative to the carriage, whereby transverse movement of the carriage moves the idler gear means transversely to align said chain with a next adjacent gear in the rear gear cluster, said main pivot arm means and said auxiliary pivot means being biased to swing in a manner to maintain the chain in proper alignment with the periphery of any particular gear over which it passes and to maintain a tension in the chain, respectively.

12. The subject matter of claim 11, in which said drive means includes a cable drum coupled for rotation by said drive plate; and an auxiliary flexible cable passing about said cable drum and said cylindrical member to rotate said cylindrical member upon rotation of said drum by said drive plate, said flexible cable accommodating swinging movement of said main pivot arm means.

13. The subject matter of claim 6, in which said rear gear cluster includes a total of five gears, the three gears in addition to said first mentioned two gears having $n3$, $n4$, and $n5$ teeth respectively, different from each other and from $n1$ and $n2$, the chain engaging front and rear gears in the following sequence for each successive actuation of said manually operable lever means starting at the lowest gear ratio to the highest wherein there are ten gear positions and wherein $N1 > N2$ and $n1 > n2 > n3 > n4 > n5$:

| Gear Position | Gears Engaged |
| --- | --- |
| 1 | $N2 - n1$ |
| 2 | $N1 - n1$ |
| 3 | $N2 - n2$ |
| 4 | $N1 - n2$ |
| 5 | $N2 - n3$ |
| 6 | $N1 - n3$ |
| 7 | $N2 - n4$ |
| 8 | $N1 - n4$ |
| 9 | $N2 - n5$ |
| 10 | $N1 - n5$ | the percent change in gear ratio being substantially the same for a major number of successive shifts.

* * * * *